(12) United States Patent
Li et al.

(10) Patent No.: US 11,061,180 B2
(45) Date of Patent: Jul. 13, 2021

(54) COLOR LIQUID CRYSTAL DISPLAYS AND DISPLAY BACKLIGHTS

(71) Applicant: Intematix Corporation, Fremont, CA (US)

(72) Inventors: Yi-Qun Li, Danville, CA (US); Xianglong Yuan, Manteca, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 16/090,377

(22) PCT Filed: Apr. 19, 2018

(86) PCT No.: PCT/US2018/028450
§ 371 (c)(1),
(2) Date: Oct. 1, 2018

(87) PCT Pub. No.: WO2018/187819
PCT Pub. Date: Oct. 11, 2018

(65) Prior Publication Data
US 2019/0227213 A1  Jul. 25, 2019

Related U.S. Application Data

(60) Provisional application No. 62/480,978, filed on Apr. 3, 2017.

(51) Int. Cl.
*F21V 7/04* (2006.01)
*F21V 8/00* (2006.01)
(Continued)

(52) U.S. Cl.
CPC .......... *G02B 6/005* (2013.01); *C09K 11/7731* (2013.01); *C09K 11/886* (2013.01);
(Continued)

(58) Field of Classification Search
CPC .... G02B 5/3008; G02B 6/005; G02B 6/0023; G02F 2001/133614; G02F 2202/36;
(Continued)

(56) References Cited

U.S. PATENT DOCUMENTS

| 2011/0164431 A1* | 7/2011 | Anandan | G02B 6/0036 |
| | | | 362/606 |
| 2012/0138874 A1 | 6/2012 | Yuan et al. | |
| 2013/0235554 A1 | 9/2013 | McDavitt | |
| 2014/0158982 A1 | 6/2014 | Park et al. | |
| 2014/0198480 A1* | 7/2014 | Dai | G02B 5/0242 |
| | | | 362/84 |

(Continued)

FOREIGN PATENT DOCUMENTS

| CN | 104752590 A | 7/2015 |
| KR | 1020120127077 A | 11/2012 |

(Continued)

OTHER PUBLICATIONS

International Search Report.
(Continued)

*Primary Examiner* — William J Carter
*Assistant Examiner* — Omar Rojas Cadima
(74) *Attorney, Agent, or Firm* — CrossPond Law

(57) ABSTRACT

A display backlight, comprises: an excitation source, LED (146), for generating blue excitation light (148) with a peak emission wavelength in a wavelength range 445 nm to 465 nm; and a photoluminescence wavelength conversion layer (152). The photoluminescence wavelength conversion layer (152) comprises a mixture of a green-emitting photoluminescence material with a peak emission in a wavelength range 530 nm to 545 nm, a red-emitting photoluminescence material with a peak emission in a wavelength range 600 nm to 650 nm and particles of light scattering material.

15 Claims, 16 Drawing Sheets

(51) Int. Cl.
  *C09K 11/77* (2006.01)
  *C09K 11/88* (2006.01)
  *G02B 5/04* (2006.01)
  *G02B 5/02* (2006.01)
  *G02F 1/13357* (2006.01)
  *G02B 5/20* (2006.01)
  *G02F 1/1362* (2006.01)
  *G02F 1/1335* (2006.01)

(52) U.S. Cl.
  CPC ........... *G02B 5/0242* (2013.01); *G02B 5/045* (2013.01); *G02B 5/201* (2013.01); *G02B 6/0023* (2013.01); *G02B 6/0051* (2013.01); *G02B 6/0053* (2013.01); *G02B 6/0055* (2013.01); *G02F 1/1336* (2013.01); *G02F 1/1362* (2013.01); *G02F 1/133514* (2013.01); *G02F 1/133603* (2013.01); *G02F 1/133607* (2021.01); *G02F 1/133611* (2013.01); *G02F 1/133614* (2021.01); *G02F 1/133615* (2013.01); *G02F 2202/36* (2013.01)

(58) Field of Classification Search
  CPC . C09K 11/02; H01L 33/05; F21V 9/30; F21V 5/002
  See application file for complete search history.

(56) References Cited

U.S. PATENT DOCUMENTS

| | | |
|---|---|---|
| 2015/0124195 A1* | 5/2015 | Chen ................. G02F 1/133512 349/61 |
| 2015/0340573 A1 | 11/2015 | Yuan et al. |
| 2016/0177181 A1 | 6/2016 | Liu et al. |
| 2017/0077360 A1 | 3/2017 | Yang et al. |
| 2017/0192146 A1 | 7/2017 | Yamada et al. |
| 2018/0024404 A1 | 1/2018 | Suzuki et al. |
| 2018/0210125 A1* | 7/2018 | Song ........................ F21K 9/64 |

FOREIGN PATENT DOCUMENTS

| | | |
|---|---|---|
| KR | 1020150092800 | 8/2015 |
| TW | 201614344 A | 4/2016 |
| TW | 201624089 A | 7/2016 |
| TW | 201640196 A | 11/2016 |

OTHER PUBLICATIONS

Written Opinion of the ISA.
Office Action, TW app. No. 107113258, dated Dec. 2019.
Office Action, dated Mar. 2021; KR 10-2019-7032400.
Office Action, TW107113258, dated Oct. 2020.

* cited by examiner

COLOR LIQUID CRYSTAL DISPLAYS AND DISPLAY BACKLIGHTS

This application claims priority to, and the benefit of, U.S. Provisional Patent Application 62/480,978, filed Apr. 3, 2017, the contents of which are hereby incorporated by reference in their entirety for any and all purposes as if fully set forth herein.

BACKGROUND OF THE INVENTION

Field of the Invention

The invention relates to color liquid crystal displays (LCDs) and in particular backlight arrangement for operating color LCDs.

Description of the Related Art

Color LCDs find application in a variety of electronics devices including televisions, computer monitors, laptops, tablet computers and smart phones. As is known, most color LCDs comprise a LC (liquid crystal) display panel and a white light emitting backlight for operating the display panel.

The present invention concerns color LCDs and backlights with increased efficacy and color gamut.

SUMMARY OF THE INVENTION

Embodiments of the invention concern color LCDs that include a photoluminescence material, for example in the form of wavelength conversion layer (film), which when excited by excitation light, typically blue light, generates white light for operating the display. Typically, the photoluminescence wavelength conversion layer comprises a part of the backlight. Various embodiments of the invention concern arrangements which increase display efficacy by reducing the number of layers within the display/backlight and thereby reducing the number of air interfaces or otherwise substantially eliminating light losses at the interface between layers of the display by for example combining layers.

According to an embodiment, a display backlight, comprises: an excitation source for generating blue excitation light with a peak emission wavelength in a wavelength range 445 nm to 465 nm; and a photoluminescence wavelength conversion layer; wherein the photoluminescence wavelength conversion layer comprises a mixture of a green-emitting photoluminescence material with a peak emission in a wavelength range 530 nm to 545 nm, a red-emitting photoluminescence material with a peak emission in a wavelength range 600 nm to 650 nm and particles of light scattering material.

The inclusion of particles of a light scattering material can increase uniformity of light emission from the photoluminescence wavelength conversion layer and can eliminate the need for a separate light diffusive layer as are commonly used in known displays. Additionally, incorporating particles of a light scattering material with the mixture of green- and red-emitting photoluminescence materials can result in an increase in light generation by the photoluminescence wavelength conversion layer as well as a substantial, up to 40%, reduction in the quantity of photoluminescence materials required to generate a given color of light. Given the relatively high cost of photoluminescence materials, the inclusion of a light scattering material can result in a significant reduction in manufacturing cost for larger displays such a tablet computers, laptops, TVs and monitors.

The light scattering material can comprise, for example, particles of zinc oxide (ZnO), silicon dioxide ($SiO_2$), titanium dioxide ($TiO_2$), magnesium oxide (MgO), barium sulfate ($BaSO_4$), aluminum oxide ($Al_2O_3$), or combinations thereof. The light scattering material particles can have an average diameter such that they scatter excitation light more than photoluminescence generated red or green light. Typically, the light diffusive material particles are generally spherical and, in some embodiments, have an average diameter (D50) of 200 nm of less, typically 100 nm to 150 nm.

In some embodiments, the photoluminescence wavelength conversion layer comprises a separate film that is fabricated separate to other components of the backlight. In other embodiments, the photoluminescence wavelength conversion layer can be fabricated as a part of another component of the backlight.

In some embodiments, the photoluminescence wavelength conversion layer is disposed adjacent to a Brightness Enhancement Film (BEF). In an embodiment, the photoluminescence wavelength conversion layer can be deposited directly onto the BEF, that is, in direct contact with the BEF. An advantage of depositing the photoluminescence layer directly onto the BEF is that this can increase light emission from the backlight by eliminating an air interface between the photoluminescence layer and BEF. Such an air interface could otherwise lead to a greater probability of internal reflection of light within the photoluminescence wavelength conversion layer and reduce light coupling into the BEF. Alternatively, the photoluminescence wavelength conversion layer can be fabricated as a separate film and the film applied to the BEF.

In edge-lit backlight configurations that further comprise a light guide, the photoluminescence wavelength conversion layer can be disposed adjacent to the light guide on one or more faces or edges of the light guide. In some embodiments, the photoluminescence wavelength conversion layer is disposed on a light emitting face of the light guide between the light guide and the brightness enhancement film.

The photoluminescence wavelength conversion layer can be deposited directly (i.e. in direct contact) onto one or more faces or edges of the light guide such that it is in direct contact with the light guide. An advantage of depositing the photoluminescence wavelength conversion layer directly onto the light guide is that this can increase overall light emission from the backlight by eliminating the air interface between the light guide and the photoluminescence wavelength conversion layer.

Alternatively, the photoluminescence wavelength conversion layer can be fabricated as a separate film that can then be applied to the light guide. Fabricating the photoluminescence wavelength conversion layer separately can be advantageous when the light guide face includes a pattern of features or texturing to aid in a uniform light extraction of light from the light guide. In such an arrangement, the photoluminescence wavelength conversion layer may be in contact with such features only and thereby reducing disruption of the light guiding properties of the light guide. To reduce light escaping from a rear of the light guide, the backlight can further comprise a light reflective surface disposed adjacent to rear face of the light guide. In such embodiments, the photoluminescence wavelength conversion layer can be disposed between the light guide and the light reflective layer. The photoluminescence wavelength conversion layer can be deposited in direct contact with the light guide, direct contact with the light reflective surface or fabricated as a separate film. In some embodiments, the backlight further comprises a light diffusive layer and the photoluminescence wavelength conversion layer can be deposited in direct contact with the light diffusive layer.

In one embodiment a display backlight, comprises: an excitation source for generating blue excitation light with a peak emission wavelength in a wavelength range 445 nm to 465 nm; a brightness enhancement film; and a photoluminescence wavelength conversion layer; wherein the photoluminescence wavelength conversion layer comprises a mixture of a green-emitting photoluminescence material with a peak emission in a wavelength range 530 nm to 545 nm and a red-emitting photoluminescence material with a peak emission in a wavelength range 600 nm to 650 nm, and particles of light scattering material, wherein the photoluminescence wavelength conversion layer is in direct contact with the brightness enhancement film.

The light scattering material particles can comprise for example particles of ZnO, $SiO_2$, $TiO_2$, MgO, $BaSO_4$, $Al_2O_3$, or combinations thereof. As described above, including light scattering particles can increase uniformity of light emission, eliminate the need for a separate light diffusive layer, increase light generation as well as reduce cost by reducing the quantity of photoluminescence materials required. The light scattering material can comprise nano-sized particles such that they scatter excitation light more than photoluminescence generated light. In some embodiments, the light diffusive material particles, which may be generally spherical, have an average diameter (D50) of 200 nm of less, typically 100 nm to 150 nm.

In an embodiment, a display backlight comprises: an excitation source for generating blue excitation light with a peak emission wavelength in a wavelength range 445 nm to 465 nm; a brightness enhancement film; a photoluminescence wavelength conversion layer; and a light guide, wherein the photoluminescence wavelength conversion layer comprises a mixture of a green-emitting photoluminescence material with a peak emission in a wavelength range 530 nm to 545 nm and a red-emitting photoluminescence material with a peak emission in a wavelength range 600 nm to 650 nm, and particles of light scattering material, wherein the excitation source is configured to couple excitation light into at least one edge of the light guide; and wherein the photoluminescence wavelength conversion layer is in direct contact with the light guide.

The light scattering material particles can comprise for example particles of ZnO, $SiO_2$, $TiO_2$, MgO, $BaSO_4$, $Al_2O_3$, or combinations thereof. As described above, including light scattering particles can increase uniformity of light emission, eliminate the need for a separate light diffusive layer, increase light generation as well as reduce cost by reducing the quantity of photoluminescence materials required. The light scattering material can comprise nano-sized particles such that they scatter excitation light more than photoluminescence generated light. In some embodiments, the light diffusive material particles, which are generally spherical, have an average diameter (D50) of 200 nm of less, typically 100 nm to 150 nm.

In various embodiments, at least one of the green-emitting and red-emitting photoluminescence materials comprises particles of an inorganic phosphor material. Preferably, the phosphor(s) comprise a narrow-band material(s) with an emission peak having a FWHM (Full Width Half Maximum) of about 50 nm or narrower.

BRIEF DESCRIPTION OF THE DRAWINGS

In order that the present invention is better understood, embodiments of the invention will now be described, by way of example only, with reference to the accompanying drawings in which.

DETAILED DESCRIPTION OF THE INVENTION

Figure 1:
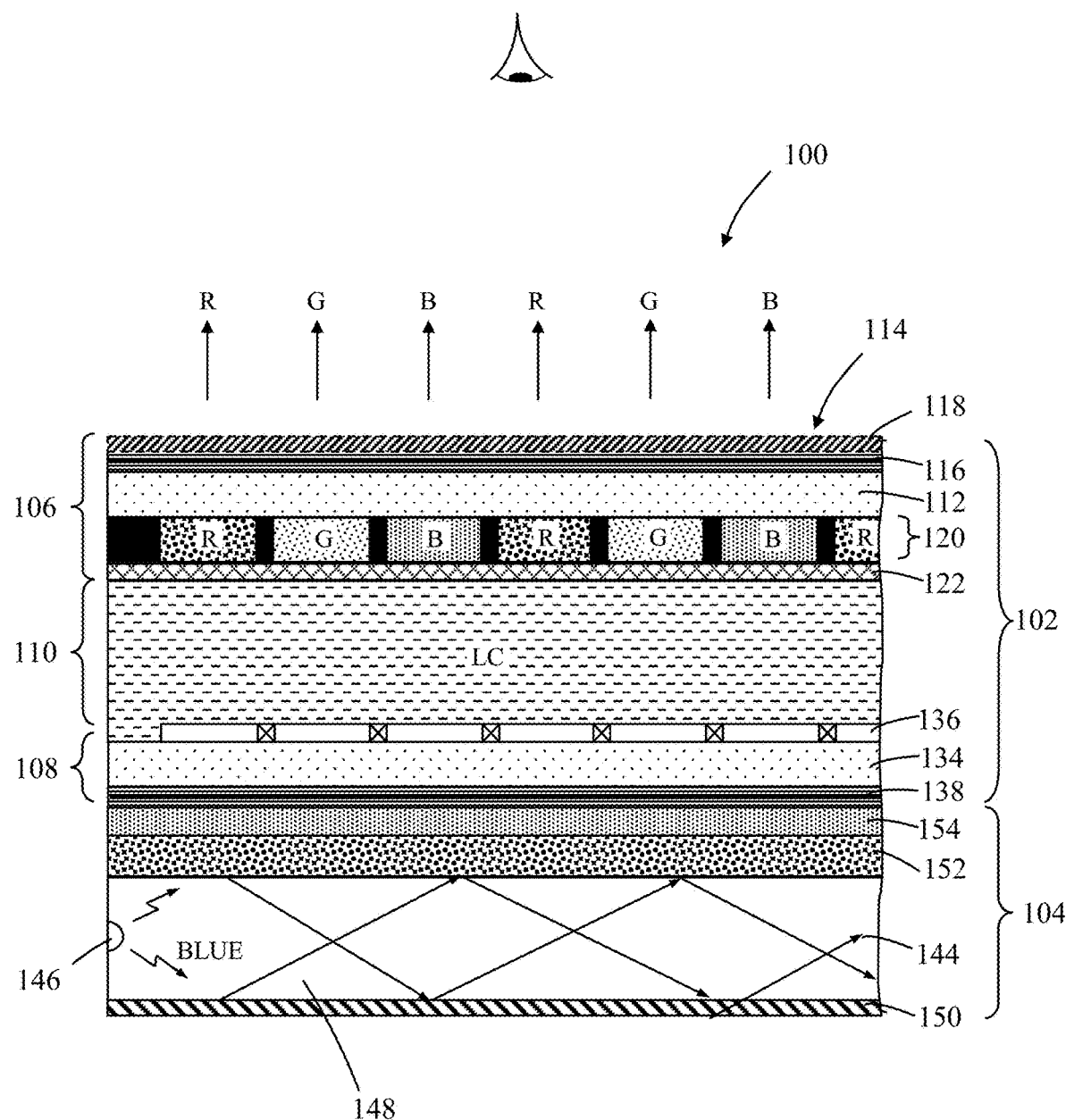
FIG. 1 is a schematic cross-sectional representation of a color LCD in accordance with an embodiment of the present invention.

Embodiments of the invention are directed to color LCDs including a photoluminescence wavelength conversion layer which when excited by excitation light, typically blue light, generates white light for operating the display. Typically, the photoluminescence wavelength conversion layer comprises a part of the backlight. Various embodiments of the invention concern arrangements which increase display efficacy by reducing the number of layers within the display/backlight or otherwise reduces light losses at the interface between layers of the display by for example minimizing the air interfaces.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration. Throughout this specification like reference numerals are used to denote like features.

Referring to FIG. 1 there is shown a schematic cross-sectional representation of a light transmissive Color LCD (Liquid Crystal Display) 100 formed in accordance with an embodiment of the invention. The Color LCD 100 comprises a LC (Liquid Crystal) Display Panel 102 and a Display Backlight 104. The Backlight 104 is operable to generate white light 140 (FIGS. 6-13) for operating the LC Display Panel 102.

LC Display Panel

As shown in FIG. 1, the LC display panel 102 comprises a transparent (light transmissive) Front (light/image emitting) Plate 106, a transparent (light transmissive) Back Plate 108 and a Liquid Crystal (LC) 110 filling the volume between the Front and Back Plates 106, 108.

Figure 2:
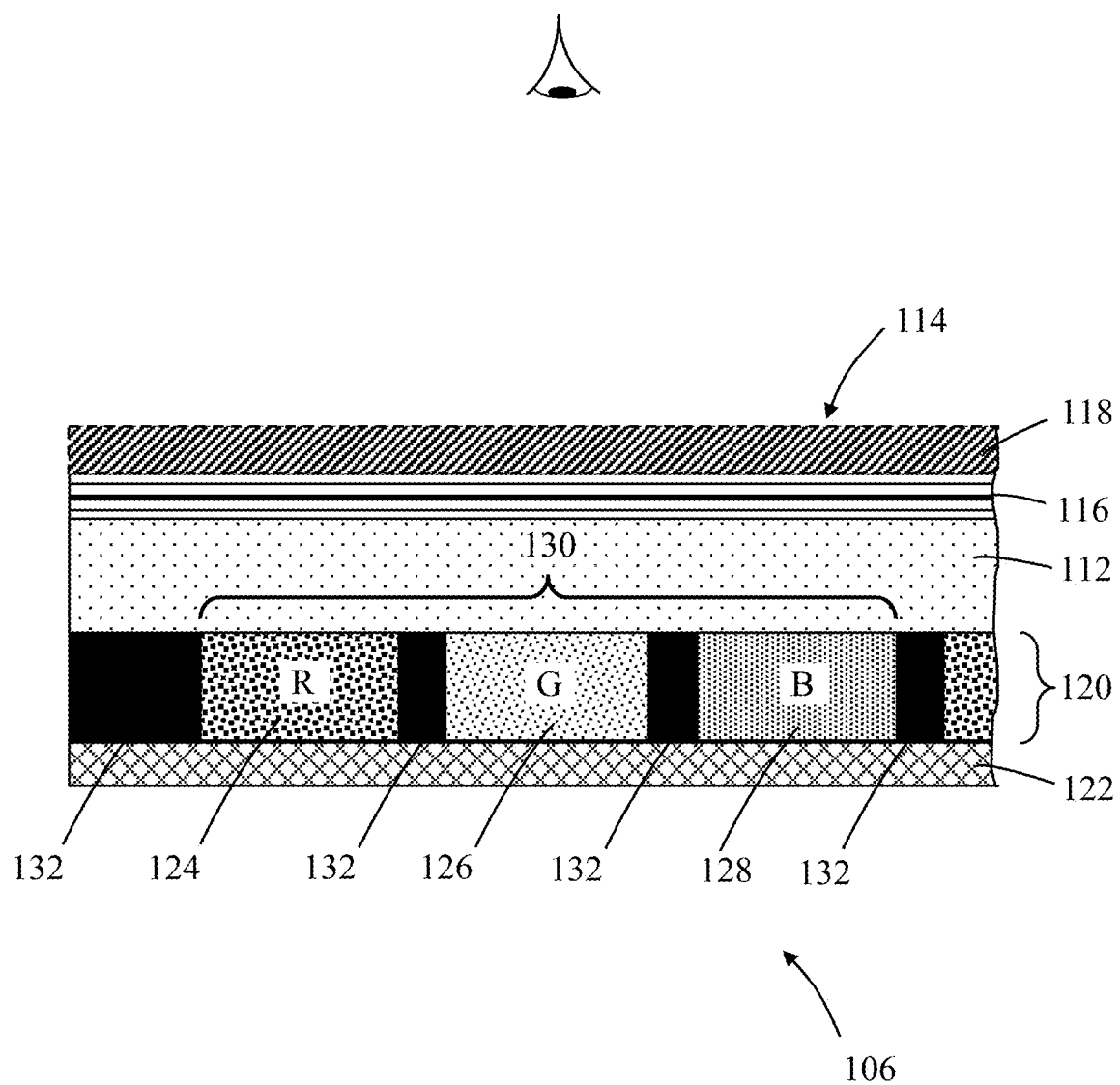
FIG. 2 is a schematic cross-sectional representation of a front plate of the color LCD of FIG. 1.

As shown in FIG. 2, the Front Plate 106 can comprise a glass plate 112 having on its upper surface, that is the face of the plate comprising the viewing face 114 of the display, a first polarizing filter layer 116. Optionally, the outermost viewing surface of the front plate can further comprise an anti-reflective layer 118. On its underside, that is the face of the front plate 106 facing the liquid crystal (LC) 110, the glass plate 112 can further comprise a color filter plate 120 and a light transmissive common electrode plane 122 (for example transparent Indium Tin Oxide, ITO).

Figure 3:
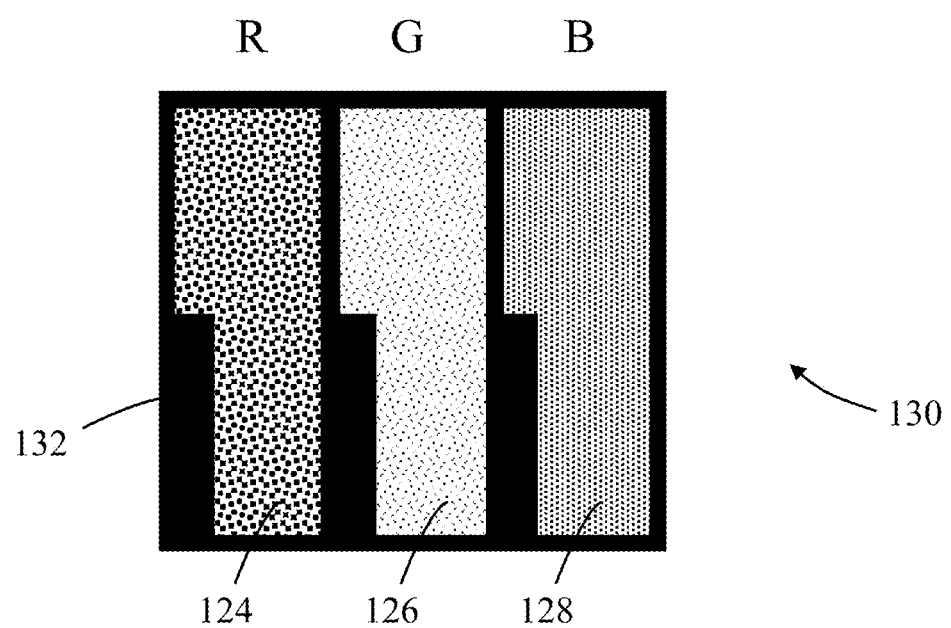
FIG. 3 is a schematic diagram of a unit pixel of a color filter plate of the color LCD of FIG. 1.
Figure 4:
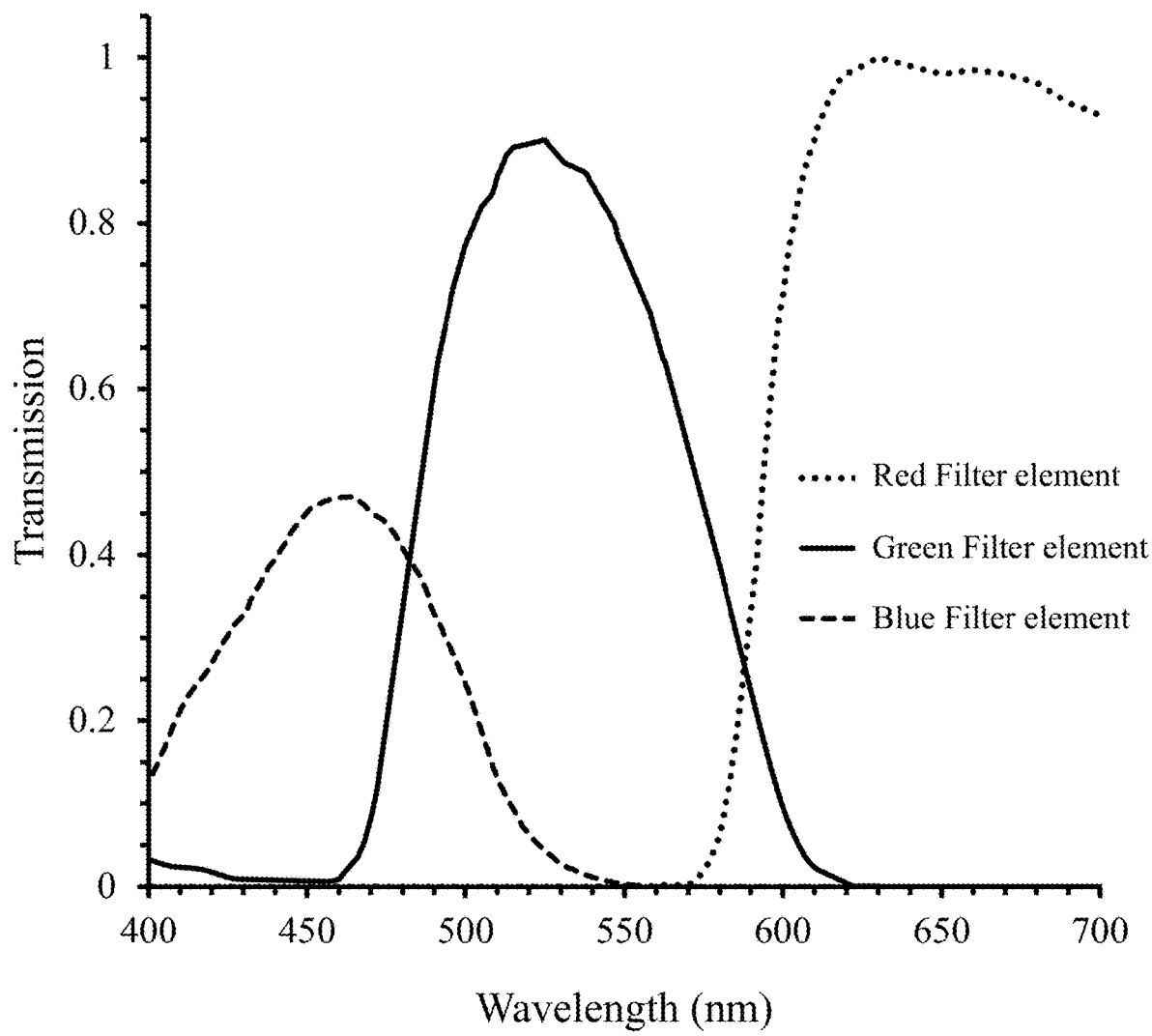
FIG. 4 shows the filtering characteristics, light transmission versus wavelength, for red, green and blue filter elements of a color filter plate of a color LCD display according to an embodiment of the invention.

The color filter plate 120 comprises an array of different color sub-pixels filter elements 124, 126, 128 which respectively allow transmission of red (R), green (G), and blue (B) light. Each unit pixel 130 of the display comprises a group of three sub-pixels filter elements 124, 126, 128. FIG. 3 is a schematic diagram of a unit pixel 130 of the color filter plate 132. As shown, each RGB sub-pixel 124, 126, 128 comprises a respective color filter pigment, typically an organic dye, which allows passage of light corresponding to the color of the sub-pixel only. The RGB sub-pixel elements 124, 126, 128 can be deposited on the glass plate 112 with opaque dividers/walls (black matrix) 132 between each of the sub-pixels 124, 126, 128. The black matrix 132 can be formed as a grid mask of metal, such as for example chromium, defining the sub-pixels 124, 126, 128 and providing an opaque gap between the sub-pixels and unit pixels 130. To minimize reflection from the black matrix, a double layer of Cr and CrOx may be used, but of course, the layers may comprise materials other than Cr and CrOx. The black matrix film which can be sputter-deposited underlying or overlying the photoluminescence material may be patterned using methods that include photolithography. FIG. 4 shows the filtering characteristics, light transmission versus wavelength, for red (R), green (G) and blue (B) filter elements of a Hisense filter plate optimized for TV applications.

Figure 5:
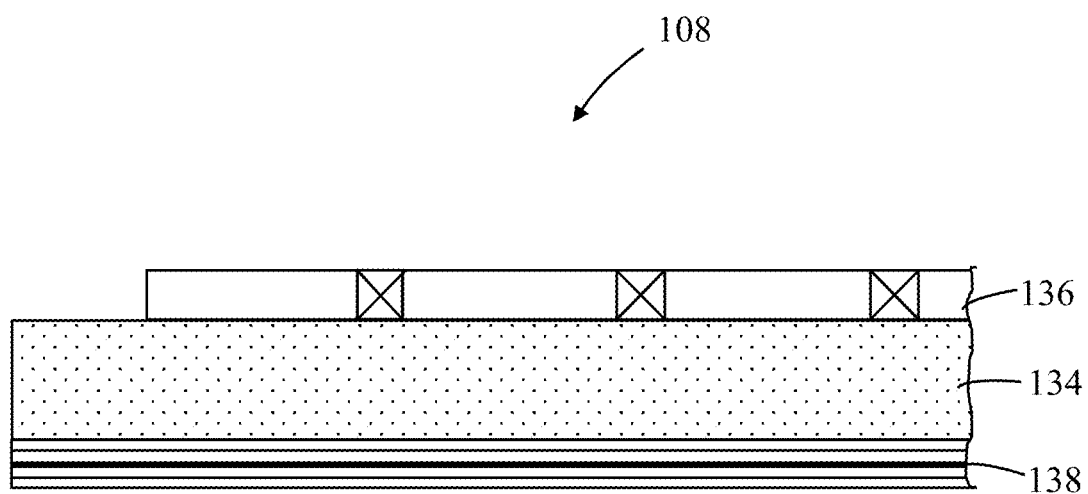
FIG. 5 is a schematic cross-sectional representation of a back plate of the color LCD of FIG. 1.

Referring to FIG. 5, the back plate 108 can comprise a glass plate 134 having on its upper surface (the surface facing the LC) a TFT (Thin Film Transistor) layer 136. The TFT layer 136 comprises an array of TFTs, in which there is a transistor corresponding to each individual color sub-pixel 124, 126, 128 of each unit pixel 130. Each TFT is operable to selectively control passage of the light to its corresponding sub-pixel. On a lower surface of the glass plate 134 there is provided a second polarizing filter layer 138. The directions of polarization of the two polarizing filters 116 and 138 are aligned perpendicular to one another.

Backlight

The Backlight 104 is operable to generate and emit white light 140 from a front light emitting face 142 (upper face that faces the rear of the Display Panel, FIG. 6) for operating the LC Display Panel 102.

Figure 6:
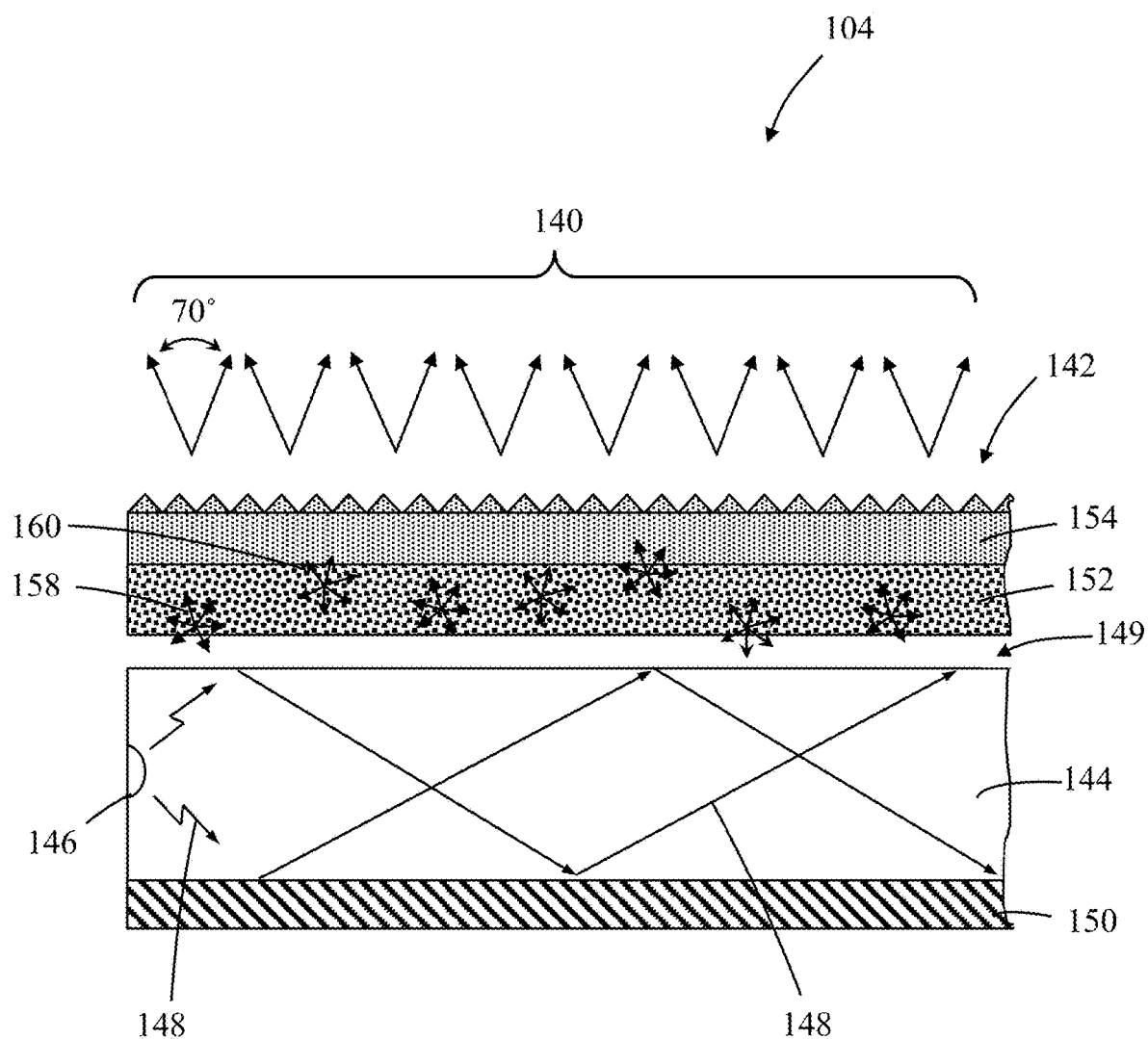
FIG. 6 is a schematic exploded cross-sectional representation of an edge-lit backlight of the color LCD of FIG. 1 in which a photoluminescence wavelength conversion layer is deposited directly on a BEF.

As shown in FIG. 6, the backlight 104 can comprise an edge-lit arrangement comprising a light guide (waveguide) 144 with one or more excitation sources 146 located along one or more edges of the light guide 144. As indicated, the light guide 144 can be planar; though, in some embodiments, it can be tapered (wedge-shaped) for promoting a more uniform emission of excitation light from a front light emitting face (upper face as shown in FIG. 6 that faces the Display Panel) of the light guide. Each excitation source 146 can comprise a blue light emitting GaN LED (dominant emission wavelength 445 nm to 465 nm), typically 450-460 nm. The LEDs 146 are configured such that in operation, they generate blue excitation light 148 which is coupled into one or more edges of the light guide 144 and then guided, by total internal reflection, throughout the volume of the light guide 148 and finally emitted from a front face 149 (upper face that faces the Display Panel 102) of the light guide 144. As shown in FIG. 6, and to prevent the escape of light from the backlight 104, the rear face (lower face as shown) of the light guide 144 can comprise a light reflective layer (surface) 150 such as Vikuiti™ ESR (Enhanced Spectral Reflector) film from 3M.

On the front light emitting face 149 (upper face as shown) of the light guide 144 there is provided a photoluminescence wavelength conversion layer 152 and a Brightness Enhancement Film (BEF) 154.

Backlight—Brightness Enhancement Film (BEF)

The Brightness Enhancement Film (BEF), also known as a Prism Sheet, comprises a precision micro-structured optical film and controls the emission of light 140 from the backlight within a fixed angle (typically 70 degrees), thereby increasing luminous efficacy of the backlight. Typically, the BEF comprises an array of micro-prisms on a light emitting face of the film and can increase brightness by 40-60%. The BEF 154 can comprise a single BEF or a combination of multiple BEFs and in the case of the latter even greater increases in brightness can be achieved. Examples of suitable BEFs include Vikuiti™ BEF II from 3M or prism sheets from MNTech. In some embodiments the BEF 154 can comprise a Multi-Functional Prism Sheet (MFPS) that integrates a prism sheet with a diffusion film and can have a better luminous efficiency than a normal prism sheet. In some embodiments, the BEF 154 can comprise a Micro-Lens Film Prism Sheet (MLFPS) such as those available from MNTech.

Backlight—Photoluminescence Wavelength conversion Layer

For the sake of brevity, in the following description the photoluminesecence wavelength conversion layer will be referred to as the "photoluminescence layer".

The photoluminescence layer 152 contains photoluminescence materials and in operation converts blue excitation light 148 into white light 140 for operating the LC Display Panel 104. More specifically, the photoluminescence layer 152 contains blue light excitable green-emitting (Peak emission wavelength 530 nm to 545 nm) and red-emitting (Peak emission wavelength 600 nm to 650 nm) photoluminescence materials. The combination of photoluminescence generated green light 158, photoluminescence generated red light 160 and unconverted blue excitation light 148 results in a white light emission product 140. To optimize the efficacy and color gamut of the display, the green- and red-emitting photoluminescence materials are selected to match their peak emission (PE) wavelength $\lambda_p$ with the transmission characteristic of their corresponding color filter elements. Preferably, the green-emitting photoluminescence material has a peak emission wavelength $\lambda_p$ 535 nm. In order to maximize display color gamut and efficacy, the green-emitting and/or red-emitting photoluminescence materials preferably comprise narrow-band emitting materials having an emission peak with a FWHM (Full Width Half Maximum) of about 50 nm of less.

The green- and red-emitting photoluminescence materials can comprise particles of phosphor materials or quantum dots (QDs) or combinations thereof. For the purposes of illustration only, the current description specifically refers to photoluminescence materials embodied as phosphor materials. The phosphor materials can comprise inorganic and organic phosphor materials. Inorganic phosphors can comprise aluminate, silicate, phosphate, borate, sulfate, chloride, fluoride or nitride phosphor materials. As is known, phosphor materials are doped with a rare-earth element called an activator. The activator typically comprises divalent europium, cerium or tetravalent manganese. Dopants such as halogens can be substitutionally or interstitially incorporated into the crystal lattice and can for example reside on lattice sites of the host material and/or interstitially within the host material. Examples of suitable green-emitting and red-emitting phosphor materials are given in tables 1 and 2 respectively.

TABLE 1

Example green-emitting phosphor materials

| Phosphor family | | Composition | $\lambda_p$ (nm) | FWHM (nm) |
|---|---|---|---|---|
| Sulfide | | $SrGa_2S_4$:Eu | ≈536 | 48-50 |
| β-SiAlON | | $M_xSi_{12-(m+n)}Al_{m+n}O_nN_{16-n}$:Eu M = Mg, Ca and/or Sr | 525-545 | 50-52 |
| Aluminate | YAG | $Y_3(Al_{1-x}Ga_x)_5O_{12}$:Ce | 500-550 | ≈110 |
| Aluminate | LuAG | $Lu_3(Al_{1-x}M_x)_5O_{12}$:Ce | 500-550 | ≈110 |
| Silicate | | $A_2SiO_4$:Eu A = Mg, Ca, Sr and/or Ba | 500-550 | ≈70 |
| Silicate | | $(Sr_{1-x}Ba_x)_2SiO_4$:Eu | 500-550 | ≈70 |

TABLE 2

Example red-emitting phosphor materials

| Phosphor family | | Composition | $\lambda_p$ (nm) | FWHM (nm) |
|---|---|---|---|---|
| Hexafluorosilicate | KSF | $K_2SiF_6$:$Mn^{4+}$ | ≈632 | ≈10 |
| Hexafluorosilicate | KTF | $K_2TiF_6$:$Mn^{4+}$ | ≈632 | ≈10 |
| Selenide sulfide | CSS | $MSe_{1-x}S_x$:Eu M = Mg, Ca, Sr and/or Ba | 600-630 | 50-55 |
| Selenide sulfide | CSS | CaSeS:Eu | 610-630 | 50-55 |
| Silicon-nitride 1:1:1:3 | CASN | $CaAlSiN_3$:Eu$(Ca_{1-x}Sr_x)AlSiN_3$:Eu | 600-620 | ≈75 |
| Silicon-nitride 2:5:8 | | $Ba_{2-x}Sr_xSi_5N_8$:Eu | 580-620 | ≈80 |

A quantum dot (QD) is a portion of matter (e.g. semiconductor) whose excitons are confined in all three spatial dimensions that may be excited by radiation energy to emit light of a particular wavelength or range of wavelengths. QDs can comprise different materials, for example cadmium selenide (CdSe). The color of light generated by a QD is enabled by the quantum confinement effect associated with the nano-crystal structure of the QD. The energy level of each QD relates directly to the physical size of the QD. For example, the larger QDs, such as red QDs, can absorb and emit photons having a relatively lower energy (i.e. a relatively longer wavelength). On the other hand, green QDs, which are smaller in size can absorb and emit photons of a relatively higher energy (shorter wavelength). Examples of suitable QDs can include: CdZnSeS (cadmium zinc selenium sulfide), $Cd_xZn_{1-x}Se$ (cadmium zinc selenide), $CdSe_xS_{1-x}$ (cadmim selenium sulfide), CdTe (cadmium telluride), $CdTe_xS_{1-x}$ (cadmium tellurium sulfide), InP (indium phosphide), $In_xGa_{1-x}P$ (indium gallium phosphide), InAs (indium arsenide), $CuInS_2$ (copper indium sulfide), CuInSe$_2$ (copper indium selenide), CuInS$_x$Se$_{2-x}$ (copper indium sulfur selenide), CuIn$_x$Ga$_{1-x}$S$_2$ (copper indium gallium sulfide), CuIn$_x$Ga$_{1-x}$Se$_2$ (copper indium gallium selenide), CuIn$_x$Al$_{1-x}$Se$_2$ (copper indium aluminum selenide), CuGaS$_2$ (copper gallium sulfide) and CuInS$_{2x}$ZnS$_{1-x}$ (copper indium selenium zinc selenide). The QD materials can comprise core/shell nano-crystals containing different materials in an onion-like structure. For example, the above described exemplary materials can be used as the core materials for the core/shell nano-crystals. The optical properties of the core nano-crystals in one material can be altered by growing an epitaxial-type shell of another material. Depending on the requirements, the core/shell nano-crystals can have a single shell or multiple shells. The shell materials can be chosen based on the band gap engineering. For example, the shell materials can have a band gap larger than the core materials so that the shell of the nano-crystals can separate the surface of the optically active core from its surrounding medium. In the case of the cadmiun-based QDs, e.g. CdSe QDs, the core/shell quantum dots can be synthesized using the formula of CdSe/ZnS, CdSe/CdS, CdSe/ZnSe, CdSe/CdS/ZnS, or CdSe/ZnSe/ZnS. Similarly, for CuInS$_2$ quantum dots, the core/shell nanocrystals can be synthesized using the formula of CuInS$_2$/ZnS, CuInS$_2$/CdS, CuInS$_2$/CuGaS$_2$, CuInS$_2$/CuGaS$_2$/ZnS and so on.

There are a variety of ways of implementing the backlight and in particular the photoluminescence layer 152.

In some embodiments, the photoluminescence layer 152 is disposed adjacent to the BEF 154. When using inorganic phosphor materials, the green-emitting and red-emitting phosphors, which are in the form of particles, can be incorporated as a mixture in a curable light transmissive liquid binder material and the mixture deposited as a uniform layer on a light transmissive substrate using for example screen printing or slot die coating. In some embodiments, the BEF 154 can comprise the light transmissive substrate and the photoluminescence layer 152 can be deposited directly onto the BEF 154. FIG. 6 is a schematic exploded cross-sectional representation of a backlight in which the photoluminescence layer 152 is disposed between the light guide 144 and BEF 154 and is deposited directly to the lower face of the BEF 154. In this patent specification, depositing directly means in direct contact with, in that is there is no intervening layer or air gap between the layers. For the purpose of illustration only, the various layers are shown separated when they are not in direct contact with each other, that is where they are fabricated separately and then stacked together. When depositing the photoluminescence wavelength conversion layer using screen printing, the light transmissive binder material can comprise for example a light transmissive UV-curable acrylic adhesive such as UVA4103 clear base from STAR Technology of Waterloo, Ind. USA. A particular advantage of depositing the photoluminescence layer directly onto the BEF is that this can increase light emission from the backlight by eliminating an air interface between the photoluminescence layer and BEF. Such an air interface could otherwise lead to a greater probability of internal reflection of light within the photoluminescence layer and reduce light coupling into the BEF.

Figure 7:
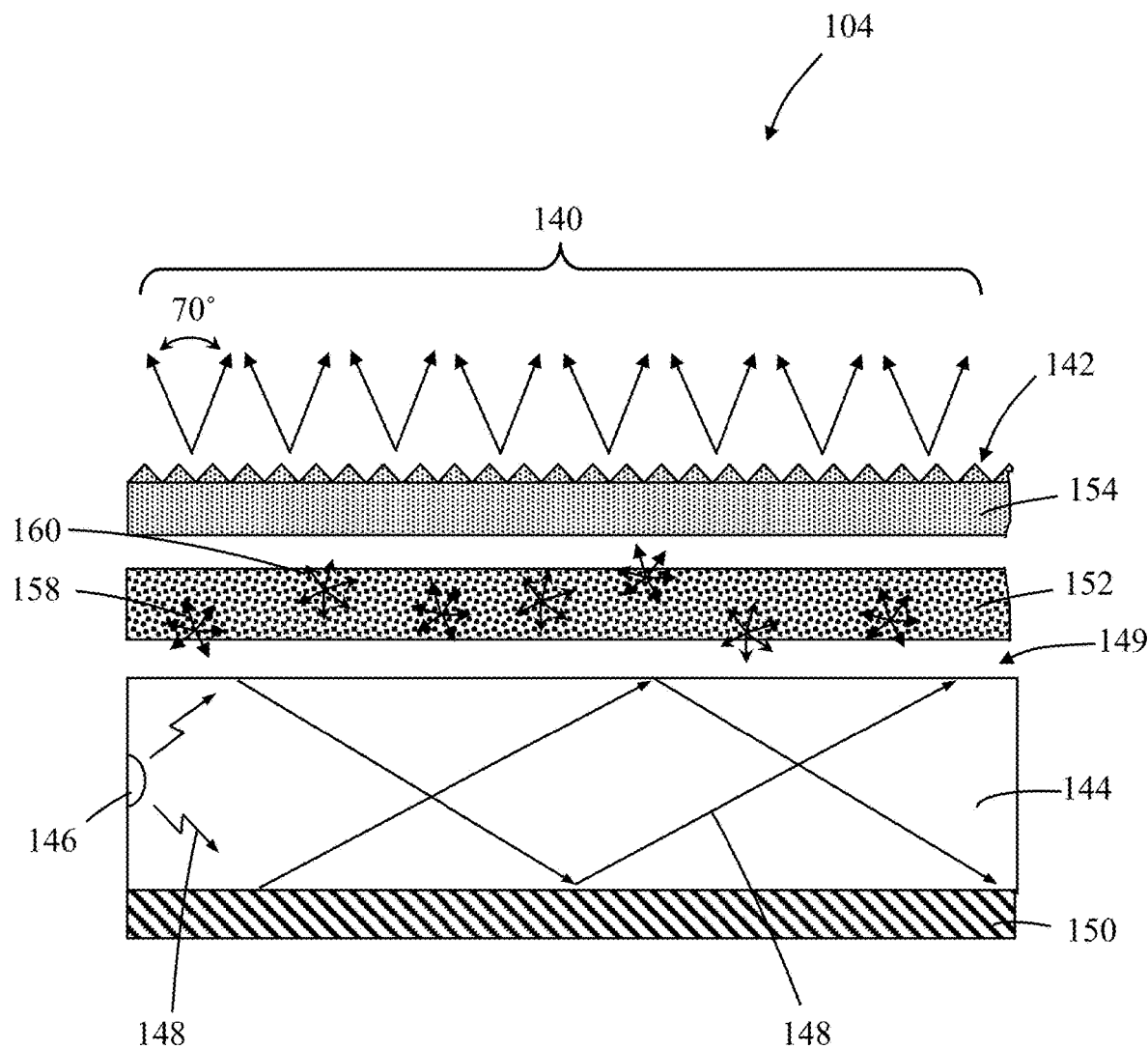
FIG. 7 is a schematic exploded cross-sectional representation of an edge-lit backlight in accordance with an embodiment of the invention in which a separate photoluminescence wavelength conversion layer is located between a light guide and a BEF.

In other embodiments, as shown in FIG. 7, the photoluminescence layer 152 can be fabricated as a separate film and the resulting film then located between the lightguide 144 and BEF 154. Fabricating the photoluminescence layer separately can be advantageous when the lower face of the BEF 154 includes a pattern of features or surface texturing.

For example, in one arrangement, the mixture of green- and red-emitting phosphors and light transmissive material are deposited, for example, by screen printing as a uniform layer onto a light transmissive film, such as for example Mylar™. In other embodiments, the green- and red-emitting phosphors can be incorporated in and homogeneously distributed throughout a film which can then be applied to the BEF 154.

Figure 8:
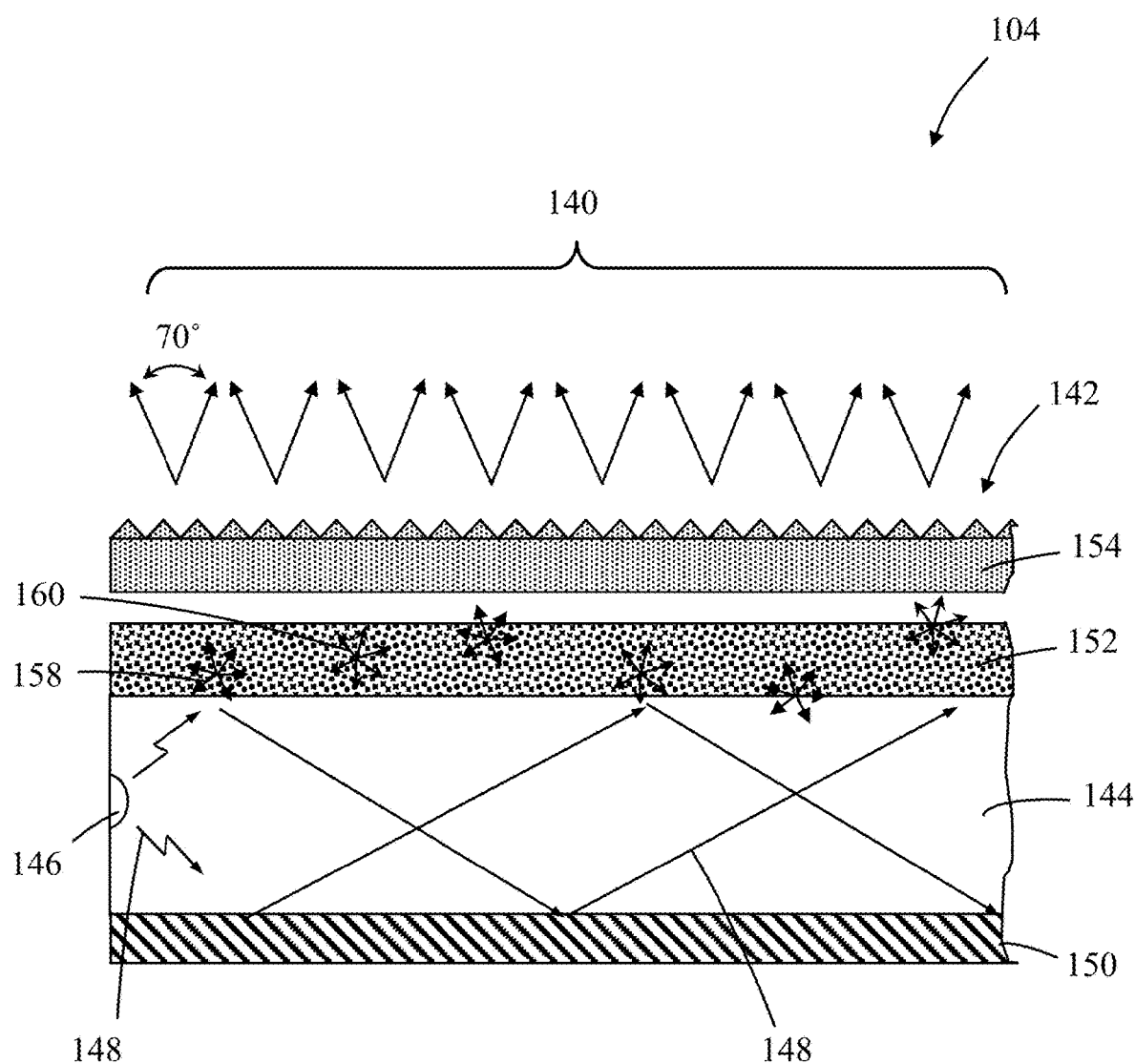
FIG. 8 is a schematic exploded cross-sectional representation of an edge-lit backlight in accordance with an embodiment of the invention in which a photoluminescence wavelength conversion layer is deposited directly on a front face of a light guide.
Figure 9:
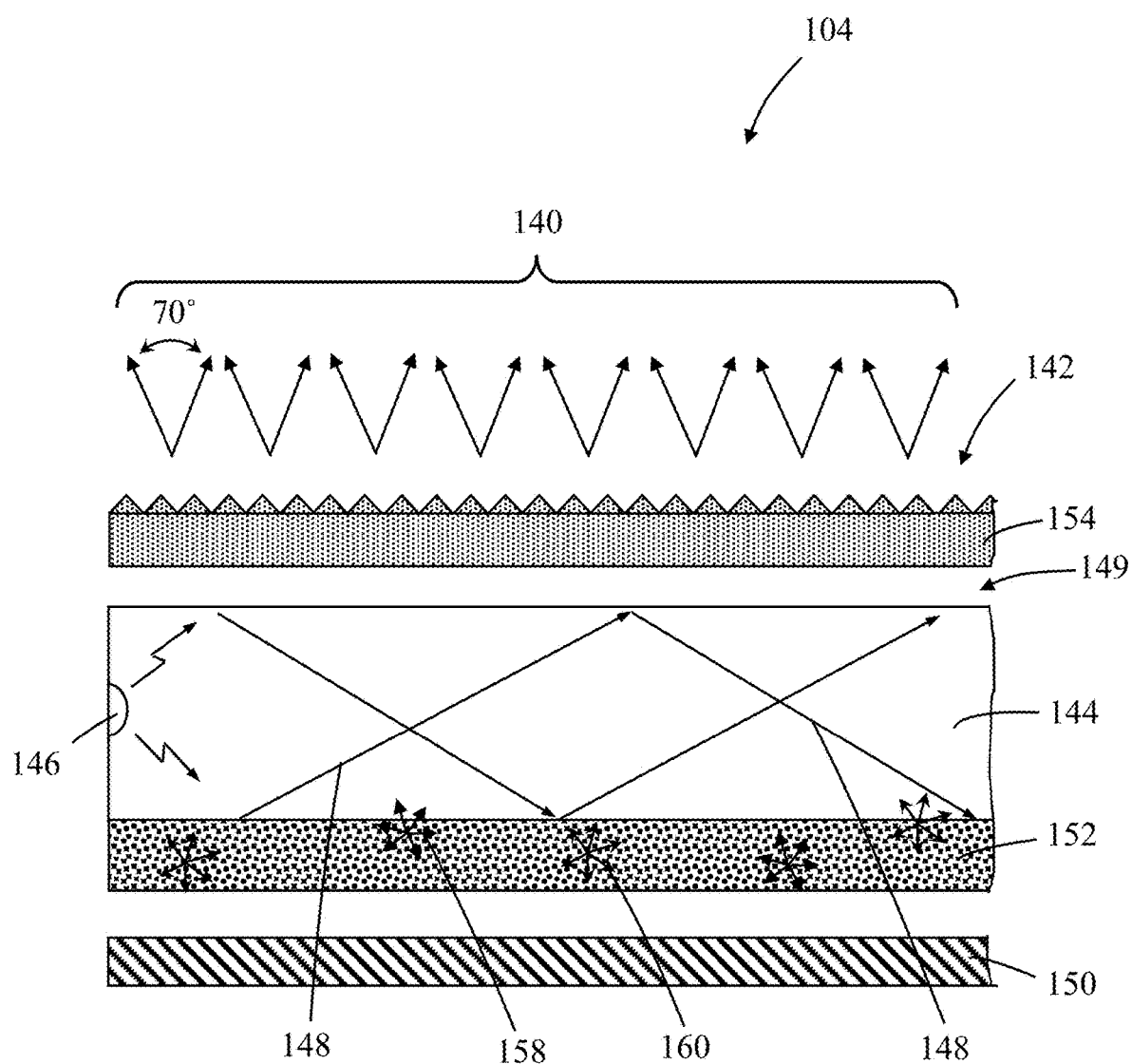
FIG. 9 is a schematic exploded cross-sectional representation of an edge-lit backlight in accordance with an embodiment of the invention in which a photoluminescence wavelength conversion layer is deposited directly on a rear face of a light guide.

In other embodiments, as illustrated in FIGS. 8 and 9, the photoluminescence layer 152 can be disposed adjacent to the light guide 144. In FIG. 8 the photoluminescence layer 152 is disposed between the light guide 144 and the BEF 154 adjacent to the front light emitting face (upper face as shown that faces the Display Panel) of the light guide 144. In some embodiments, the photoluminescence layer 152 can be deposited directly onto the front light emitting face of the light guide 144. FIG. 8 is a schematic exploded cross-sectional representation of a backlight in which the photoluminescence layer 152 is disposed between the light guide 144 and BEF 154 and is deposited directly to the front face of the light guide 144. An advantage of depositing the photoluminescence layer directly onto the front face of the light guide is that this can increase overall light emission from the backlight through the elimination an air interface between the light guide and photoluminescence layer. Such an air interface, if present, could reduce light coupling from the light guide into the photoluminescence layer and reduce overall light emission from the backlight.

In other embodiments, the photoluminescence layer 152 can be fabricated as a separate film and the resulting film then applied to the front light emitting face of the light guide 144. As indicated in FIG. 7. Such an arrangement can be advantageous when the front light emitting face 149 of the light guide 144 includes a pattern of features or texturing that is used to aid in a uniform light extraction of light from the light guide.

Figure 10:
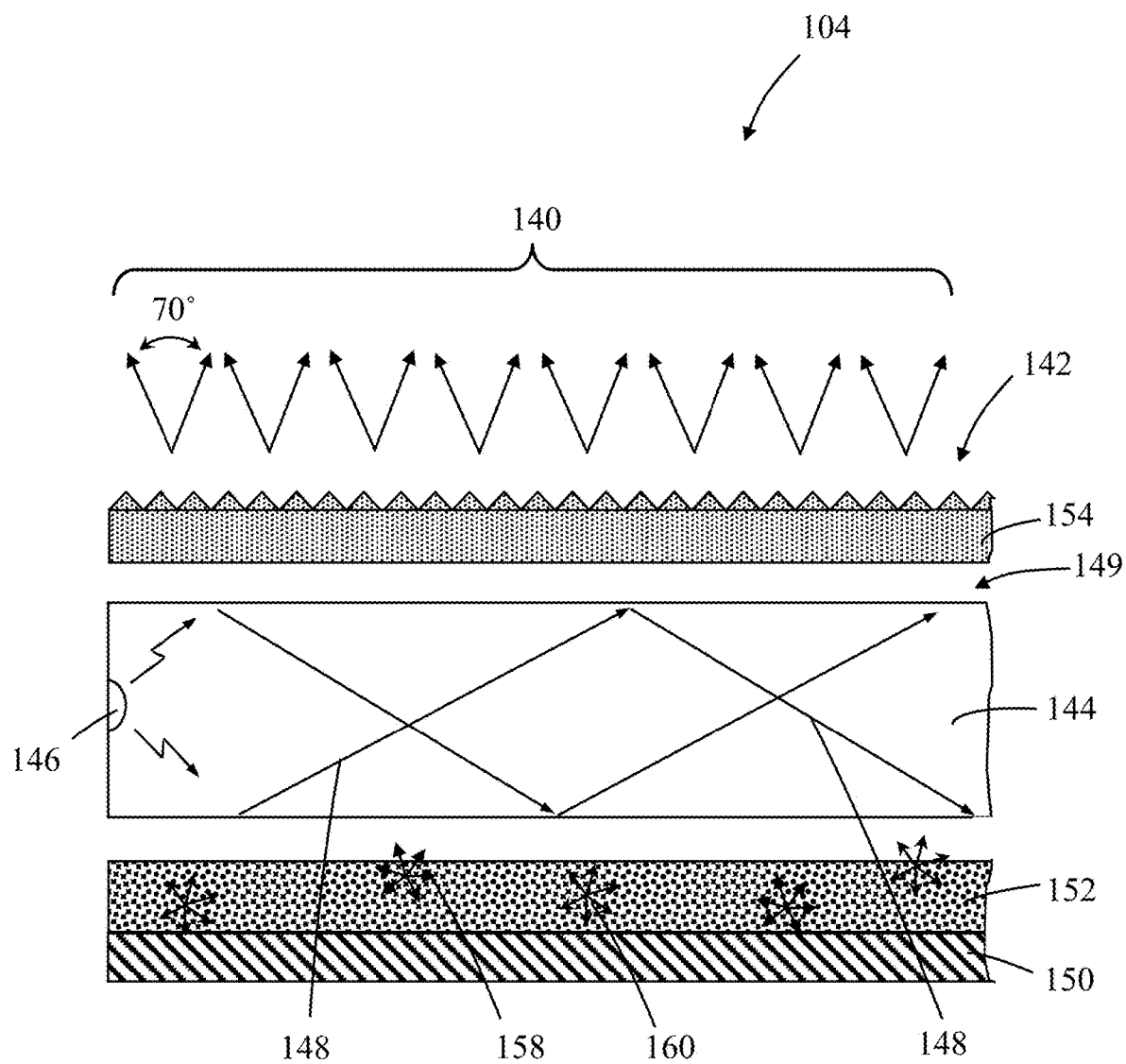
FIG. 10 is a schematic exploded cross-sectional representation of an edge-lit backlight in accordance with an embodiment of the invention in which a photoluminescence wavelength conversion layer is deposited directly on a light reflective layer.
Figure 11:
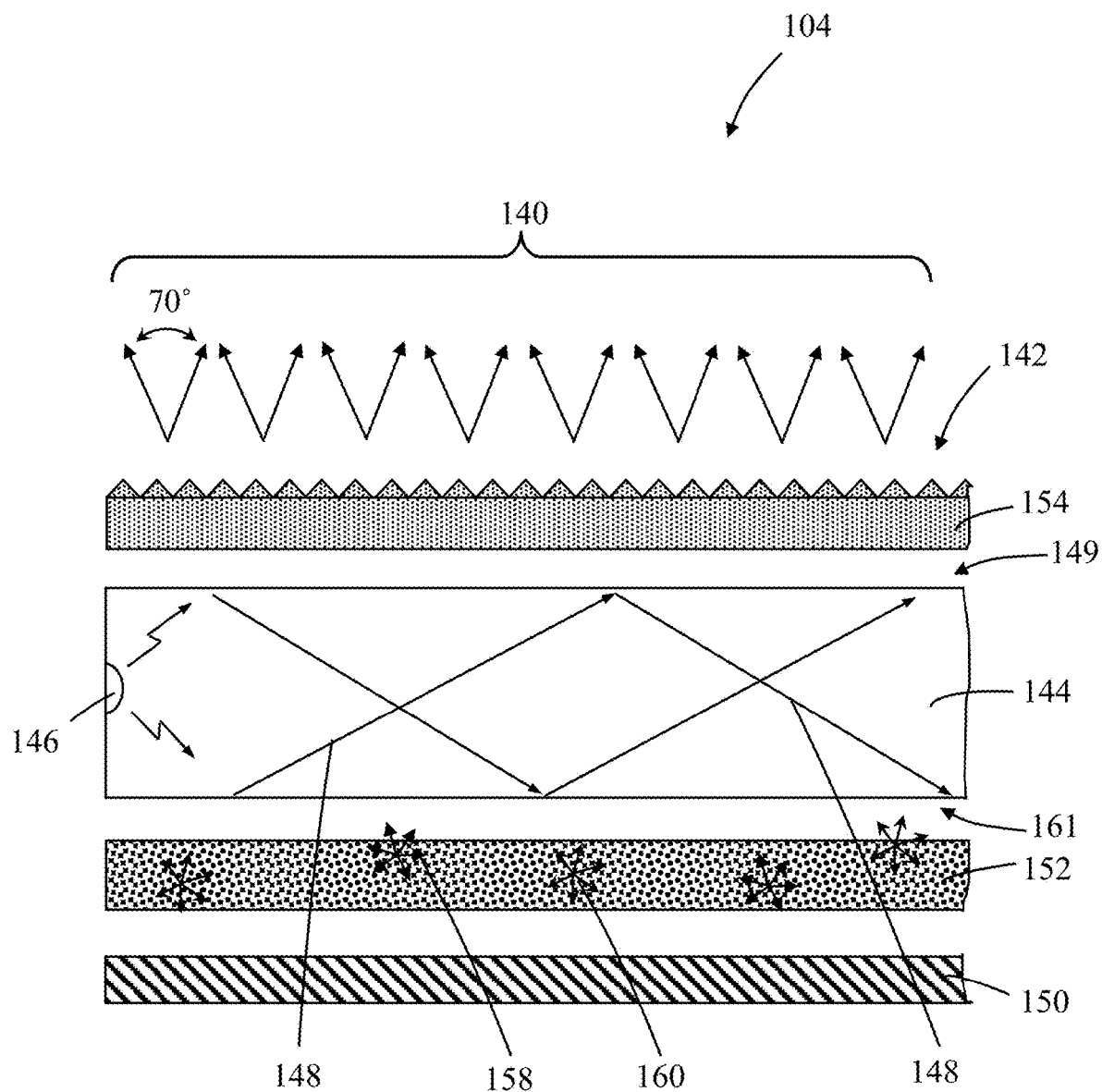
FIG. 11 is a schematic exploded cross-sectional representation of an edge-lit backlight in accordance with an embodiment of the invention in which a separate photoluminescence wavelength conversion layer is located between a light guide and a light reflective layer.

In other embodiments, and as indicated in FIGS. 9, 10 and 11, the photoluminescence layer 152 is disposed between the rear face (lower face as shown) of the light guide 144 and the light reflective layer 150. In some embodiments, the photoluminescence layer 152 can be deposited directly onto the rear face of the light guide 144. FIG. 9 is a schematic exploded cross-sectional representation of a backlight in which the photoluminescence layer 152 is disposed between the light guide 144 and light reflective layer 150 and is deposited directly to the rear face of the light guide 144. An advantage of depositing the photoluminescence layer directly onto the rear face of the light guide is that this can increase overall light emission from the backlight through the elimination an air interface between the light guide and photoluminescence layer. Such an air interface, if present, could reduce light coupling from the light guide into photoluminescence layer and reduce overall light emission from the backlight.

In other embodiments, the photoluminescence layer 152 can be deposited directly onto the light reflective layer 150. FIG. 10 is a schematic exploded cross-sectional representation of a backlight in which the photoluminescence layer 152 is disposed between the light guide 144 and light reflective layer 150 and is deposited directly to the light reflective layer 150. An advantage of depositing the photoluminescence layer directly onto the light reflective layer 150 is that this can increase overall light emission from the backlight through the elimination an air interface between the photoluminescence layer and light reflective layer. Such an air interface. if present, could reduce backward directed light being reflected back in a direction towards the light emitting face 142 of the backlight.

In yet other embodiments, and as indicated in FIG. 11, the photoluminescence layer 152 can be fabricated as a separate film and the resulting film then applied to the rear face 161 of the light guide 144. Such an arrangement can be advantageous when the rear emitting face of the light guide 144 includes a pattern of features of texturing to aid in a uniform light extraction of light from the light guide.

An advantage of using a photoluminescence layer in accordance with the invention (FIGS. 6-11) as compared with known displays that utilize white LED, is that due to the light diffusive nature of phosphor materials this can eliminate the need for a separate light diffusive layer and the associated interface losses and thereby increase display efficacy as well as reducing production costs.

Figure 12:
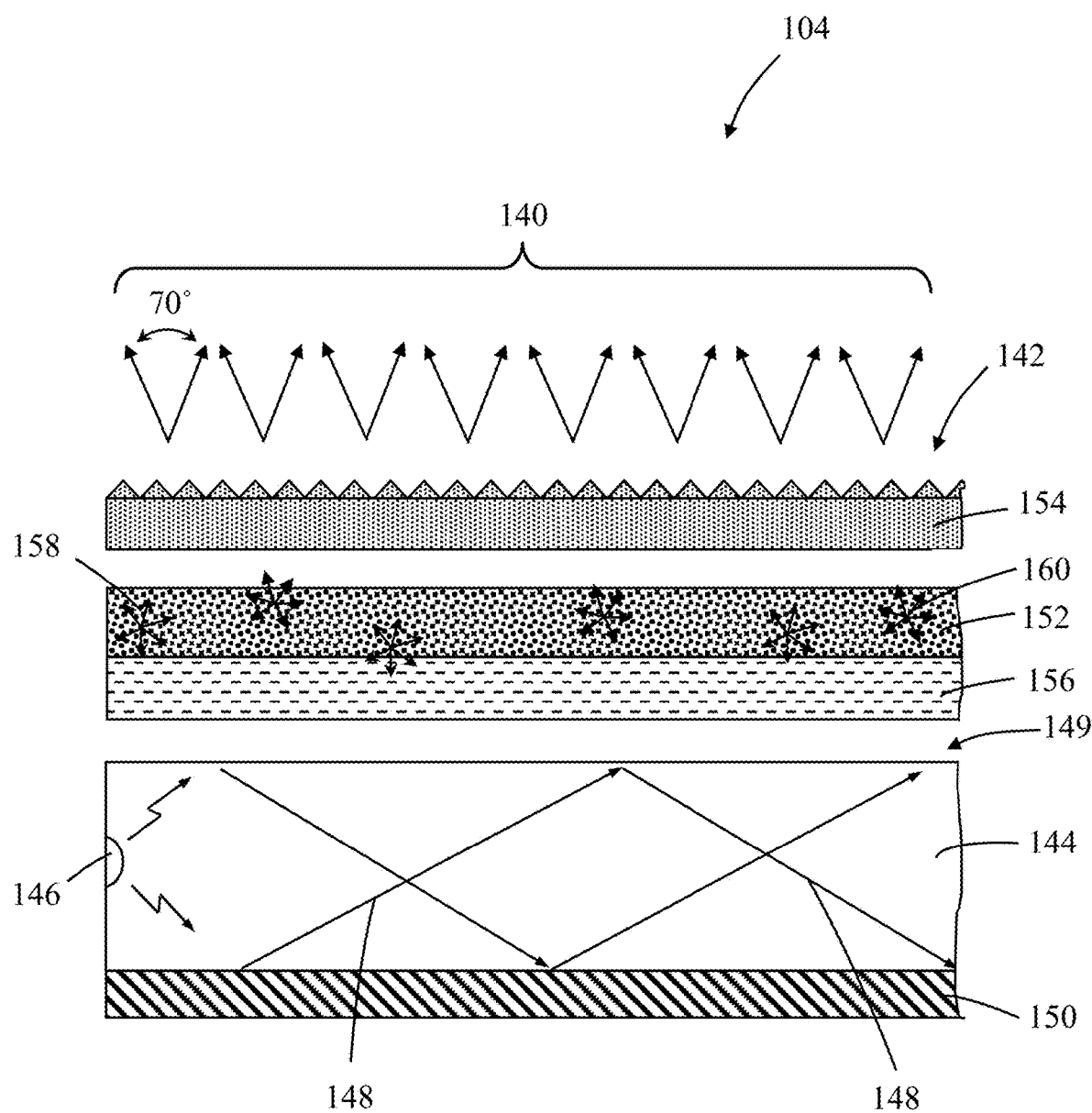
FIG. 12 is a schematic exploded cross-sectional representation of an edge-lit backlight in accordance with an embodiment of the invention in which a photoluminescence wavelength conversion layer is deposited directly on a light diffusive layer.

However, due to the isotropic nature of photoluminescence light generation, green light 158 and red light 160 generated by the green- and red-emitting phosphors will be emitted in all directions including directions towards the light guide 144. To reduce the likelihood of such light reaching the light guide 144, the backlight can in some embodiments further comprise a light diffusive layer 156 disposed between the photoluminescence layer 152 and the light guide 144. In some embodiments, and as illustrated in FIG. 12, the photoluminescence layer 152 can be deposited directly onto the light diffusive layer 156. FIG. 12 is a schematic exploded cross-sectional representation of a backlight in which the photoluminescence layer 152 is disposed between a light diffusive layer 156 and the light guide 144 and is deposited directly to the face of the light diffusive layer 156. An advantage of depositing the photoluminescence layer directly onto the light diffusive layer 156 is that this can increase overall light emission from the backlight through the elimination an air interface between the light diffusive and photoluminescence layers. Such an air interface, if present, could reduce light coupling between the light diffusive and photoluminescence layers and reduce overall light emission from the backlight.

Figure 13:
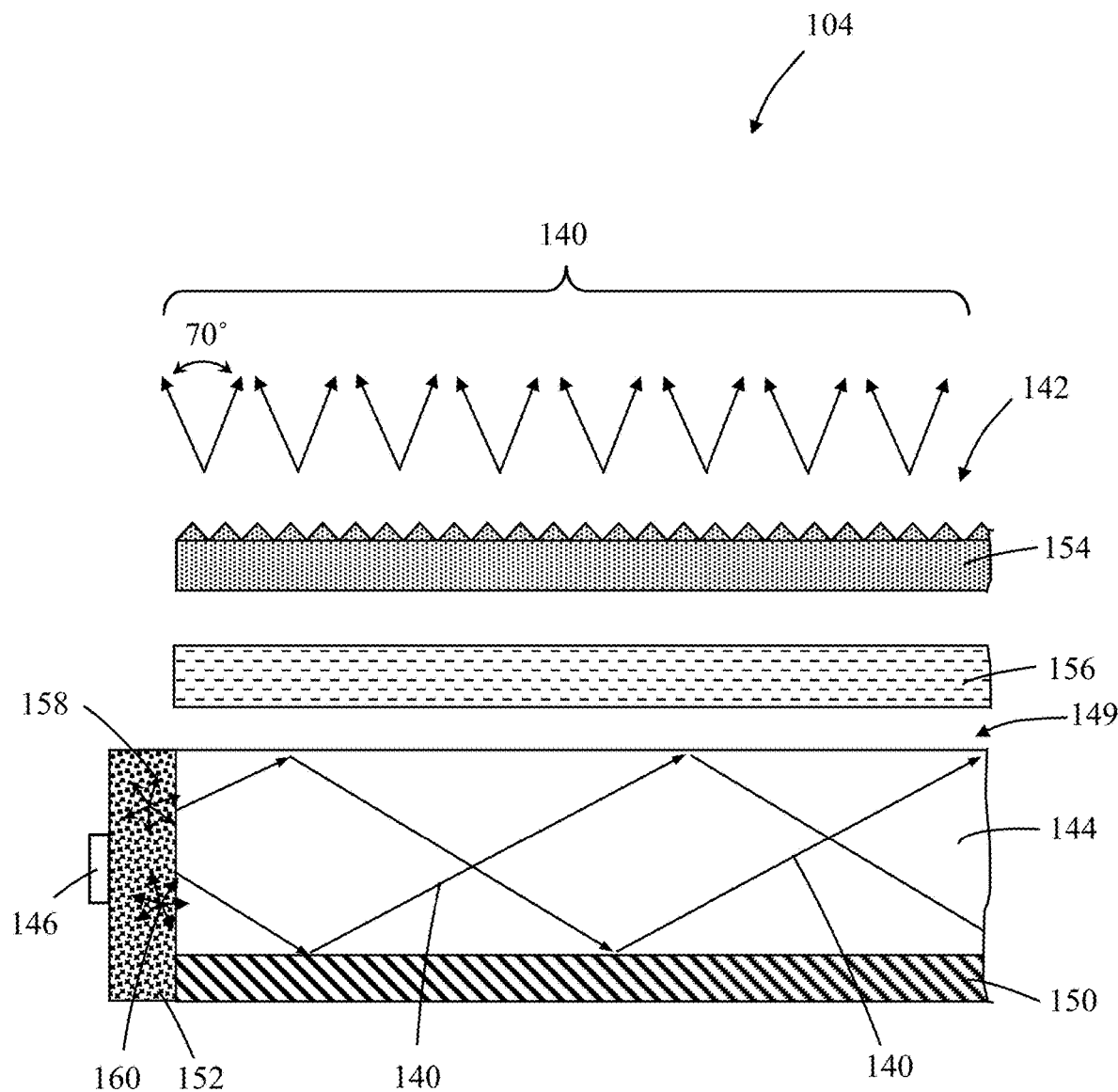
FIG. 13 is a schematic exploded cross-sectional representation of an edge-lit backlight in accordance with an embodiment of the invention in which a photoluminescence wavelength conversion layer is disposed on an edge of the light guide.

In other embodiments, and as indicated in FIG. 13, the photoluminescence layer 152 can be disposed on an edge of the light guide 144. In some embodiments, the photoluminescence layer 152 can be deposited directly onto the edge of the light guide 144. In such arrangements it will be appreciated that white light 140 is coupled into the light guide. FIG. 13 is a schematic exploded cross-sectional representation of a backlight in which the photoluminescence layer 152 is deposited directly to an edge of the light guide 144. An advantage of depositing the photoluminescence layer directly onto the edge of the light guide is that this can increase overall light emission from the backlight through the elimination of an air interface between the light guide and photoluminescence layer. Such an air interface, if present, could reduce light coupling from the photoluminescence layer to the light the light guide and reduce overall light emission from the backlight. Additionally, the photoluminescence layer can eliminate the need for a separate light diffusive layer. Optionally, in some embodiments, the backlight as indicated in FIG. 13 can further comprise a light diffusive layer 156.

Figure 14:
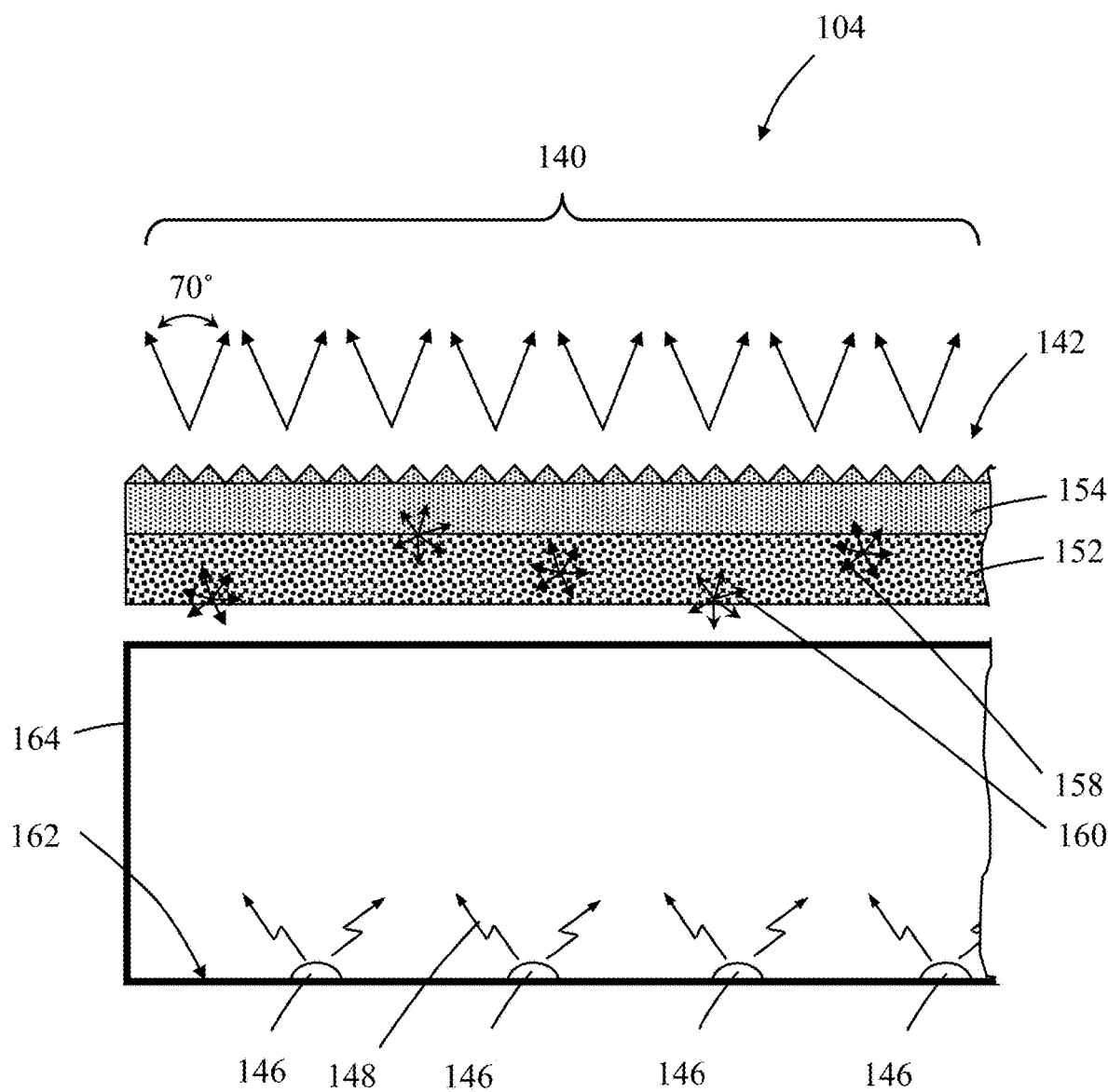
FIG. 14 is a schematic exploded cross-sectional representation of a direct-lit backlight in accordance with an embodiment of the invention.

While in the foregoing embodiments the backlight has been an edge-lit arrangement utilizing a light guide, various embodiments of the invention find utility in direct-lit backlights that comprise an array of LEDs configured over the surface of the LC display panel. FIG. 14 illustrates such an embodiment in which an array of excitation sources 146 are provided on the floor 162 of a light reflective enclosure 164.

In some embodiments the photoluminescence layer 152 can be deposited directly onto the BEF 154. In other embodiments, the photoluminescence layer 152 can be fabricated as a separate film and the resulting film then applied to the BEF 154. In each of the foregoing arrangements the photoluminescence layer 152 is disposed on a face of the BEF 154.

In any of the embodiments described (FIGS. 6-14), the photoluminescence layer 152 preferably further incorporate particles of a light scattering (diffusive) material, preferably zinc oxide (ZnO). The light diffusive material can comprise silicon dioxide ($SiO_2$), titanium dioxide ($TiO_2$), magnesium oxide (MgO), barium sulfate ($BaSO_4$), aluminium oxide ($Al_2O_3$) or combinations thereof. Inclusion of a light scattering material can increase uniformity of light emission from the photoluminescence layer and can eliminate the need for a separate light diffusive layer 156. Additionally, incorporating particles of a light scattering material with the mixture of green- and red-emitting phosphor can result in an increase in light generation by the photoluminescence layer and a substantial, up to 40%, reduction in the quantity of phosphor materials required to generate a given color of light. Given the relatively high cost of phosphor materials, inclusion of an inexpensive light scattering material can result in a significant reduction in manufacturing cost for larger displays such a tablet computers, laptops, TVs and monitors. Further details of an exemplary approach to implement scattering particles are described in U.S. Pat. No. 8,610,340 issued Dec. 17, 2013, which is hereby incorporated by reference in its entirety. The size of the light scattering particles can be selected to scatter excitation light relatively more than light generated by the phosphor. In some embodiments, the light scattering material particles have an average diameter (D50) of 200 nm of less, typically 100 nm to 150 nm. In embodiments incorporating a light scattering material, the photoluminescence layer 152 can be disposed on the BEF 154 (FIG. 6); disposed between the front face of the light guide 144 and the BEF 154 (FIG. 7); disposed on the front face of the light guide (FIG. 8); disposed between the rear face 161 of the light guide 144 and light reflective layer 150 (FIGS. 9 to 11); disposed on the light diffusive layer 156 (FIG. 12); disposed on an edge of the light guide (FIG. 13); or direct-lit arrangements (e.g. FIG. 14).

As described above, due to the isotropic nature of photoluminescence light generation, green light 158 and red light 160 will be emitted in all directions including emission in directions towards the light guide 144. To reduce the likelihood of such light reaching the light guide 144, the backlight can in some embodiments further comprise a light diffusive layer 156 disposed between the photoluminescence layer 152 and the light guide 144 even when the photoluminescence layer 152 already includes light scattering material. In other embodiments, the photoluminescence layer 152 and light diffusive layer can be fabricated as separate films and the films then applied to one another.

Example Color LCD and Backlight

TABLE 3 tabulates details of a photoluminescence layer of a backlight in accordance with the invention for use in a lap top computer. In this example, the green-emitting phosphor comprises a narrow-band green-emitting strontium gallium sulfide phosphor of composition $SrGa_2S_4$:Eu, peak emission wavelength $\lambda_p$=536 nm and the red-emitting phosphor comprises a narrow-band red-emitting calcium selenium sulfide phosphor of composition CaSeS:Eu, peak emission wavelength $\lambda_p$=632 nm. A mixture of the green- and red-emitting phosphors is incorporated in, and homogeneously distributed throughout a UV curable light transmissive acrylic binder (UVA4103 from STAR Technology) with a weight loading of 28% $SrGa_2S_4$:Eu and 17.5% CaSeS:Eu and the mixture screen printed as a ~50 μm thickness layer on a ~140 μm light transmissive PET (Polyethylene terephthalate) film. The backlight comprises the arrangement of FIG. 6 and utilizes GaN LED chips with a dominant emission wavelength of 447 nm.

TABLE 3

Photoluminescence wavelength conversion layer of a backlight in accordance with the invention

| green phosphor ($\lambda_p$) | green phosphor loading (wt %) | Red phosphor ($\lambda_p$) | red phosphor loading (wt %) | CIE x | CIE y | Color Gamut % NTSC |
|---|---|---|---|---|---|---|
| $SrGa_2S_4$:Eu (536 nm) | 28 | CaSeS:Eu (632 nm) | 17.5 | 0.3039 | 0.3184 | 87 |

Figure 15:
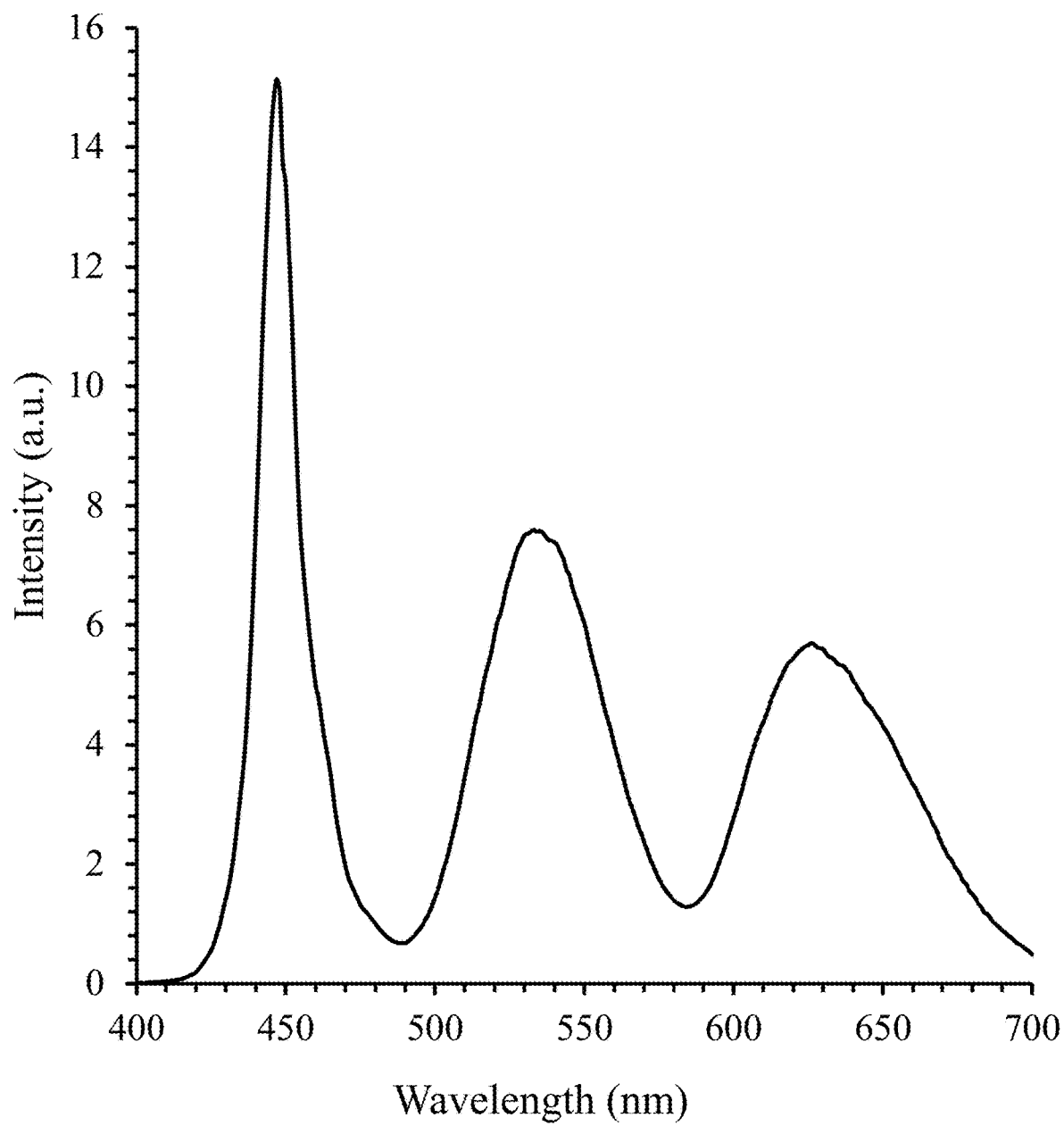
FIG. 15 shows emission spectrum, intensity versus wavelength, for a backlight in accordance with an embodiment of the invention.
Figure 16:
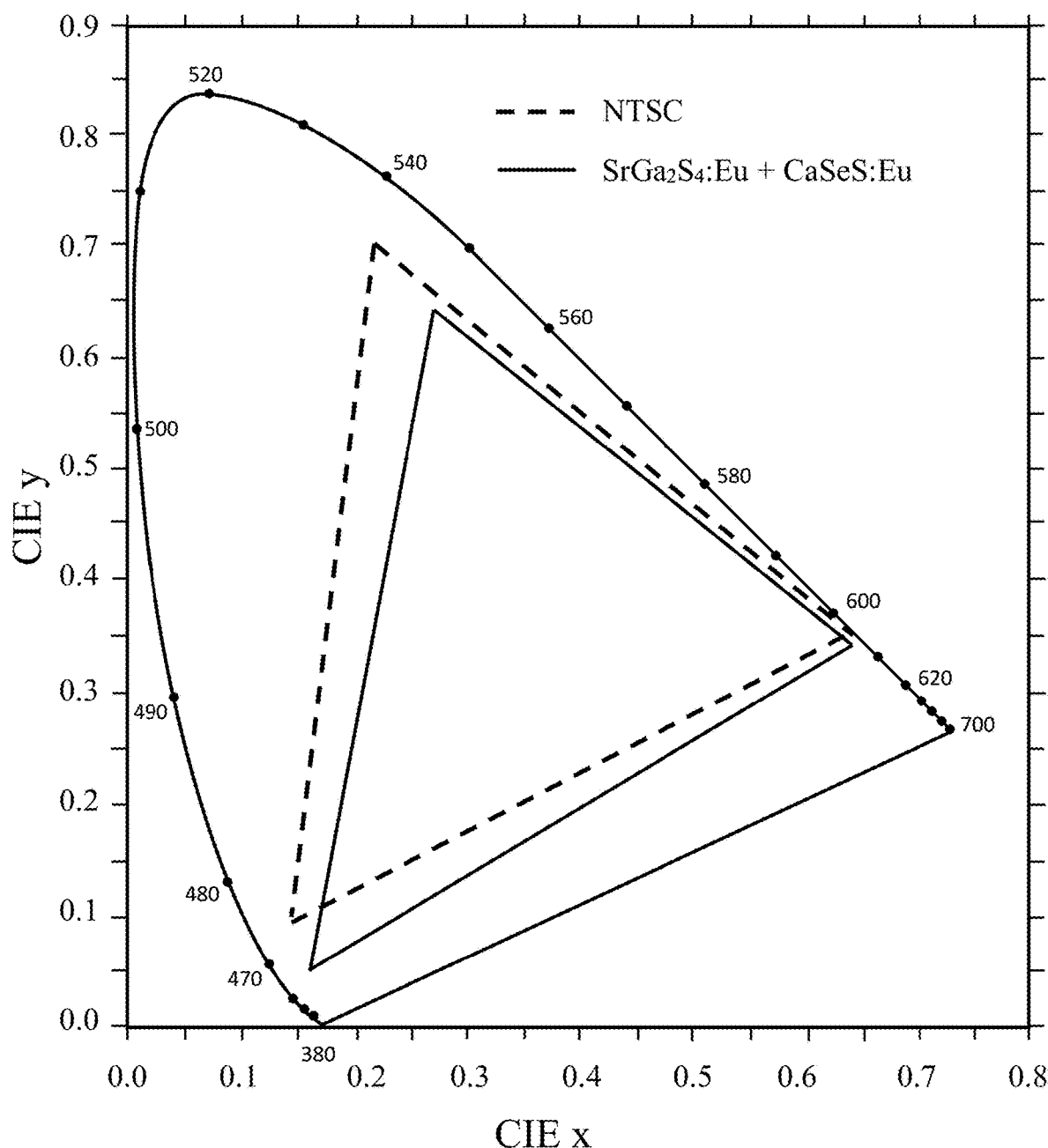
FIG. 16 shows the 1931 CIE color coordinates of the NTSC standard and RGB color coordinates of a backlight according to some embodiments.

TABLE 3 tabulates the optical characteristics of the backlight, CIE x and CIE y and d FIG. 15 shows the emission spectra for the backlight and FIG. 16 shows the 1931 CIE color coordinates of the NTSC standard and RGB color coordinates of the backlight. As can be seen from TABLE 3, the backlight produces light with color gamut of 87% of the NTSC (National Television System Committee) colorimetry 1953 (CIE 1931).

It will be appreciated that the present invention is not restricted to the specific embodiments described and that variations can be made that are within the scope of the invention.

REFERENCE NUMERALS

100 Color LCD
102 LC Display Panel
104 Edge-lit backlight
106 Front plate
108 Back plate
110 Liquid Crystal (LC)
112 Glass plate
114 Viewing face
116 First polarizing filter layer
118 Anti-reflective layer
120 Color filter plate
122 Light transmissive common electrode plane
124 Red sub-pixel filter element
126 Green sub-pixel filter element
128 blue sub-pixel filter element
130 Unit pixel
132 Opaque divider/black matrix
134 Glass plate
136 TFT
138 Second polarizing filter layer
140 white Light
142 Light emitting face of Backlight
144 Light guide
146 Excitation source
148 Excitation light
149 Front Face of Light Guide
150 Light reflective layer
152 Photoluminescence wavelength conversion layer (photoluminescence layer)
154 Brightness Enhancement Film (BEF)
156 Light diffusive layer
158 Green light
160 Red light
161 Rear Face of Light Guide
162 Floor of light reflective enclosure
164 Light reflective enclosure It will be understood that the following clauses form part of the disclosure of the invention defined herein. More particularly, the invention herein may be defined by the combination of the features of the clauses as detailed below, and said clauses may be utilized to amend the combination of the features within the claims of this application.

CLAUSES

1. A display backlight, comprising:
    an excitation source for generating blue excitation light with a peak emission wavelength in a wavelength range 445 nm to 465 nm; and
    a photoluminescence wavelength conversion layer;
    wherein the photoluminescence wavelength conversion layer comprises a mixture of a green-emitting photoluminescence material with a peak emission in a wavelength range 530 nm to 545 nm, a red-emitting photoluminescence material with a peak emission in a wavelength range 600 nm to 650 nm and particles of light scattering material.
2. The backlight of Clause 1, wherein the photoluminescence wavelength conversion layer is a separate film.
3. The backlight of Clause 1 or Clause 2, wherein the particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.
4. The backlight of any of Clauses 1 to 3, wherein light scattering material particles have an average diameter of 200 nm or less.
5. The backlight of any of Clauses 1 to 4, wherein light scattering material particles have an average diameter of 100 nm to 150 nm.
6. The backlight of any of Clauses 1 to 5, wherein the photoluminescence wavelength conversion layer is disposed adjacent to the brightness enhancement film.
7. The backlight of any of Clauses 1 to 6, wherein the photoluminescence wavelength conversion layer is in direct contact with the brightness enhancement film.
8. The backlight of any of Clauses 1 to 7, further comprising a light guide, wherein the excitation source is configured to couple excitation light into at least one edge of the light guide and wherein the photoluminescence wavelength conversion layer is disposed adjacent to the light guide.
9. The backlight of any of Clauses 1 to 8, wherein the photoluminescence wavelength conversion layer is disposed on the light guide between the light guide and the brightness enhancement film.
10. The backlight of any of Clauses 1 to 8, wherein the photoluminescence wavelength conversion layer is in direct contact with the light guide.
11. The backlight of any of Clauses 1 to 8, further comprising a light reflective surface, wherein the photoluminescence wavelength conversion layer is disposed between the light reflective surface and the light guide.
12. The backlight of Clause 11, wherein the photoluminescence wavelength conversion layer is in direct contact with the light guide.
13. The backlight of Clause 11, wherein the photoluminescence wavelength conversion layer is in direct contact with the light reflective surface.

14. The backlight of Clause 1, further comprising a light diffusive layer, wherein the photoluminescence wavelength conversion layer is in direct contact with the light diffusive layer.

15. A display backlight, comprising:
an excitation source for generating blue excitation light with a peak emission wavelength in a wavelength range 445 nm to 465 nm;
a brightness enhancement film; and
a photoluminescence wavelength conversion layer;
wherein the photoluminescence wavelength conversion layer comprises a mixture of a green-emitting photoluminescence material with a peak emission in a wavelength range 530 nm to 545 nm and a red-emitting photoluminescence material with a peak emission in a wavelength range 600 nm to 650 nm, and particles of light scattering material;
wherein the photoluminescence wavelength conversion layer is in direct contact with the brightness enhancement film.

16. The backlight of Clause 15, wherein the particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

17. A display backlight, comprising:
an excitation source for generating blue excitation light with a peak emission wavelength in a wavelength range 445 nm to 465 nm;
a brightness enhancement film;
a photoluminescence wavelength conversion layer; and
a light guide,
wherein the photoluminescence wavelength conversion layer comprises a mixture of a green-emitting photoluminescence material with a peak emission in a wavelength range 530 nm to 545 nm and a red-emitting photoluminescence material with a peak emission in a wavelength range 600 nm to 650 nm, and particles of light scattering material,
wherein the excitation source is configured to couple excitation light into at least one edge of the light guide; and
wherein the photoluminescence wavelength conversion layer is in direct contact with the light guide.

18. The backlight of Clause 17, wherein the particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

What is claimed is:
1. A display backlight, comprising:
an excitation source that generates blue excitation light with a peak emission wavelength from 445 nm to 465 nm; and
a wavelength conversion component wherein the wavelength conversion component comprises a film having:
a photoluminescence layer; and
a light diffusive layer;
wherein the photoluminescence layer comprises:
a light transmissive binder; and
a narrow-band green-emitting photoluminescence material with a peak emission wavelength from 530 nm to 545 nm and a FWHM of 50 nm or less,
wherein the narrow-band green-emitting photoluminescence material is incorporated in the light transmissive binder and
wherein the photoluminescence layer is directly deposited as a uniform layer on the light diffusive layer.
2. The backlight of claim 1, wherein the photoluminescence layer further comprises particles of a light scattering material, said particles of light scattering material being incorporated in the light transmissive binder as a mixture with the narrow-band green-emitting photoluminescence material.

3. The backlight of claim 2, wherein the particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

4. The backlight of claim 2, wherein light scattering material particles have an average diameter of 200 nm or less.

5. The backlight of claim 2, wherein light scattering material particles have an average diameter of 100 nm to 150 nm.

6. The backlight of claim 1, further comprising a brightness enhancement film disposed adjacent to the photoluminescence layer of the photoluminescence wavelength conversion component.

7. The backlight of claim 1, further comprising a light guide, wherein the excitation source is configured to couple blue excitation light into at least one edge of the light guide and wherein the photoluminescence wavelength conversion component is disposed adjacent to a light emitting face of the light guide with the diffusing layer facing the light emitting face of the light guide.

8. The backlight of claim 1, wherein the narrow-band green-emitting photoluminescence material comprises at least one of: $SrGa_2S_4$:Eu, and β-SiAlON.

9. The backlight of claim 1, wherein the photoluminescence layer further comprises a narrow-band red-emitting photoluminescence material with a peak emission wavelength from 600 nm to 650 nm and a FWHM of 50 nm or less, said narrow-band red-emitting photoluminescence material being incorporated in the light transmissive binder as a mixture with the narrow-band green-emitting photoluminescence material.

10. The backlight of claim 9, wherein the narrow-band red-emitting photoluminescence material comprises at least one of: $K_2SiF_6$:$Mn^{4+}$, $K_2TiF_6$:$Mn^{4+}$, CaSeS:Eu, and $MSe_{1-x}S_x$:Eu where M is at least one of Mg, Ca, Sr, and Ba.

11. The backlight of claim 1, wherein no particles of a light scattering material are present in the photoluminescence layer.

12. A method of fabricating a wavelength conversion component for a display backlight comprising a film having a light diffusive layer and a photoluminescence layer comprising a narrow-band green-emitting photoluminescence material with a peak emission wavelength from 530 nm to 545 nm and a FWHM of 50 nm or less, the method comprising:
providing a light diffusive layer;
incorporating particles of the narrow-band green-emitting photoluminescence material in a curable light transmissive liquid binder to form a mixture;
directly depositing said mixture as a uniform layer on the light diffusive layer by screen printing or slot die coating; and
curing the light transmissive binder.

13. The method of claim 12, further comprising incorporating particles of a narrow-band red-emitting photoluminescence material in the curable light transmissive liquid binder as a mixture with the narrow-band green-emitting photoluminescence material,
wherein said narrow-band red-emitting photoluminescence material has a peak emission wavelength from 600 nm to 650 nm and a FWHM of 50 nm or less.

14. The method of claim 12, further comprising incorporating particles of a light scattering material in the curable light transmissive liquid binder as a mixture with the narrow-band green-emitting photoluminescence material.

15. A product produced by the method of claim 12.

* * * * *